(12) United States Patent
Vandyke

(10) Patent No.: US 12,451,985 B1
(45) Date of Patent: Oct. 21, 2025

(54) SYSTEM AND METHOD FOR SIMULATING SPURIOUS POWER OF RADIO FREQUENCY (RF) MIXER

(71) Applicant: Keysight Technologies, Inc., Santa Rosa, CA (US)

(72) Inventor: Rulon Vandyke, Suwanee, GA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 312 days.

(21) Appl. No.: 18/124,797

(22) Filed: Mar. 22, 2023

(51) Int. Cl.
*H04B 17/00* (2015.01)
*H04B 17/391* (2015.01)
*H04W 52/36* (2009.01)

(52) U.S. Cl.
CPC ..... *H04B 17/3912* (2015.01); *H04B 17/0087* (2013.01); *H04W 52/365* (2013.01)

(58) Field of Classification Search
CPC ........... H04B 17/3912; H04B 17/0087; H04W 52/365
See application file for complete search history.

(56) References Cited

U.S. PATENT DOCUMENTS

| | | | |
|---|---|---|---|
| 7,299,166 B1 | 11/2007 | Liu et al. | |
| 8,417,502 B1 | 4/2013 | Anati et al. | |
| 10,623,031 B2 | 4/2020 | Delos et al. | |
| 10,666,303 B1 * | 5/2020 | Ahirwar | H04B 1/0475 |
| 2011/0122923 A1 * | 5/2011 | Saitou | H04B 1/713 |
| | | | 375/136 |

OTHER PUBLICATIONS

Jiang Liu et al., "Automated Measurement of Intermodulation Tables for Mixers", IEEE 61st ARFTG Conference Digest, Jun. 2003, pp. 85-95.
Jiang Liu et al., "A Table-Based Asymmetric System Mixer Model", Anritsu Company, Jan. 2003, pp. 1-4.

* cited by examiner

*Primary Examiner* — Sulaiman Nooristany

(57) ABSTRACT

Simulating an RF mixer includes mixing input and LO signals at an RF mixer and measuring a mixed output signal, where the input signal has a characterization RF frequency and the LO signal has a characterization LO frequency; determining spurious peak powers and spurious frequencies corresponding to the spurious peak powers of the mixed output signal; specifying a saturation condition of the RF mixer; determining equations defining frequencies of the mixed output signal in terms of the characterization RF and LO frequencies at the corresponding spurious peak powers; and simulating mixing of simulated input and LO signals to output a simulated mixed output signal from a mixer model corresponding to the RF mixer by applying the equations to the simulated RF and LO frequencies to determine simulated spurious frequencies, and simulated spurious peak powers and simulated spurious phases corresponding to the simulated spurious frequencies of the simulated mixed output signal.

20 Claims, 6 Drawing Sheets

SYSTEM AND METHOD FOR SIMULATING SPURIOUS POWER OF RADIO FREQUENCY (RF) MIXER

BACKGROUND

Simulating a radio frequency (RF) mixer is generally considered to be the most difficult behavioral model for emulating real world behavior. Current mixer models require gathering extensive measured data of spurious responses at the RF mixer output for accurate modeling, which is a very laborious and time-consuming process.

Generally, mixer models have been simplified to model only certain aspects of non-ideal behavior of an RF mixer. This results in different mixer models being created for different specific purposes, rather than provide a unified mixer model that addresses the non-ideal behaviors. For example, vector network analyzers (VNAs) are able to easily measure mixer gain, compression and noise figure, so a mixer model may be created just for modeling these specific behaviors.

A conventional mixer model, typically called a "table mixer," uses a matrix of data based on harmonics of the RF input to an RF mixer in one direction and harmonics of a local oscillator (LO) input to the RF mixer in the other direction, where table entries consist of measurements at the mixer output. Data is saved in the table as relative values to the peak mixer output. Table entries are not in frequency order, so collecting the model data from hardware is very laborious and time-consuming, as mentioned above. To characterize the RF mixer, the user must calculate each spurious frequency and then take a measurement of the mixer output at that frequency using a spectrum analyzer. Also, the table data is collected at a single input power level and single input frequency. The mixer model then attempts to apply theoretical rules to extrapolate the static set of table data from RF power levels and frequencies different from the characterization values to attempt to more accurately approximate behavior of an actual RF mixer at power levels and frequencies different than those measured.

Table mixers have not worked very well, as a practical matter. They require time consuming effort just to extract data, which can be used accurately only at a single power and frequency condition. Additionally, as mixer input power increases, so do the spurious responses at the mixer output. This causes users either to increase the size of the mixer table or to ignore the higher power level spurious responses, which limits the usefulness of the mixer model. Also, the tables are provided in a wide variety of formats and data variations, which are confusing and hard to understand. Indeed, many mixer vendors do not provide mixer spurious tables because they are only valid at specific measurement conditions, where the possible different conditions that users may need are effectively impossible to predict.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
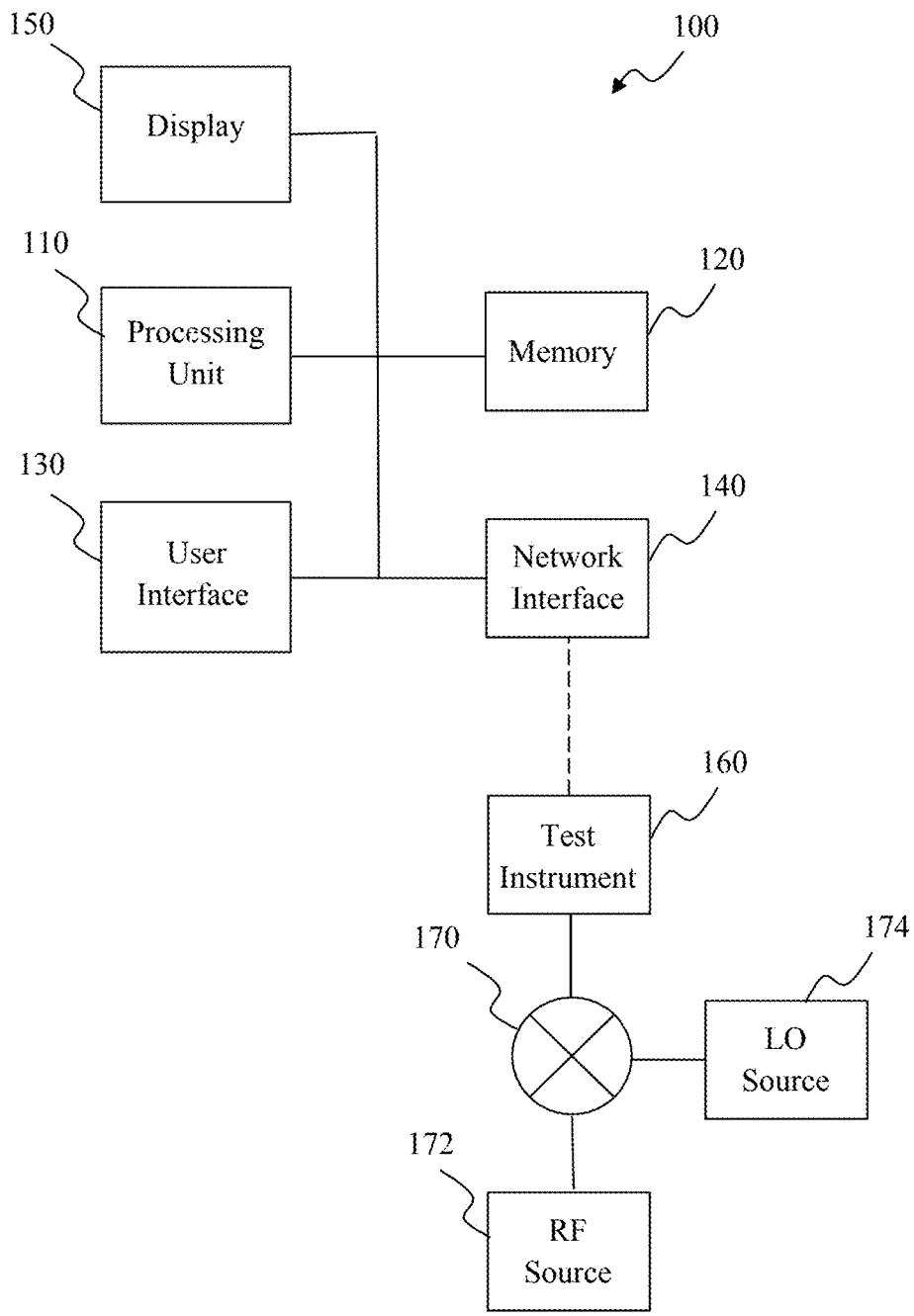
FIG. 1 is a simplified block diagram illustrating a system for simulating spurious power of an RF mixer using a behavioral mixer model, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

The various embodiments described herein provide users with the ability to create a behavioral RF mixer model for simulating spurious power of an RF mixer from only data the users are interested in modelling, rather than requiring generalized data to be gathered and fit in unwieldy legacy formats. The data may come from hardware measurements, as well as circuit simulations. The mixer model supports power dependency, so spurious response from the mixing operation may be modelled across the entire dynamic range of the RF mixer as desired by the users. Spurious peak data (spurious response data) may be collected from a spectrum analyzer or a VNA, for example, and may be used directly in the mixer model without complex coding to locate and measure spurious peak data at given locations in the spectrum. In comparison, conventional techniques may exclude spurious response data with the highest power levels.

According to a representative embodiment, a method is provided for simulating spurious power of a radio frequency (RF) mixer. The method includes mixing an input signal and a local oscillator (LO) signal at an RF mixer and measuring a mixed output signal, where the input signal has a characterization RF frequency and a characterization RF power and the LO signal has a characterization LO frequency and a characterization LO power; determining multiple spurious peak powers of the mixed output signal and multiple spurious frequencies corresponding to the spurious peak powers of the mixed output signal, respectively, where the spurious peak powers exceed a predetermined power level; specifying a saturation condition of the RF mixer; determining equations defining the spurious frequencies of the mixed output signal in terms of the characterization RF frequency and the characterization LO frequency at the corresponding spurious peak powers, respectively; and after determining the equations, simulating mixing of a simulated input signal and a simulated LO signal to output a simulated mixed output signal from an RF mixer model corresponding to the RF mixer, where the simulated RF signal has a simulated RF frequency and a simulated RF power and the simulated LO signal has a simulated LO frequency and a simulated LO power. Simulating the mixing of the simulated RF signal and the simulated LO signal includes applying the equations to the simulated RF frequency and the simulated LO frequency to determine multiple simulated spurious frequencies, multiple simulated spurious peak powers corresponding to the simulated spurious frequencies, and multiple simulated spurious phases corresponding to the simulated spurious frequencies of the simulated mixed output signal.

According to another representative embodiment, a system is provided for simulating spurious power of an RF mixer. The system includes a test instrument, a processing unit, and at least one non-transitory memory. The test instrument is configured to mix an input signal and an LO signal at an RF mixer and measuring a mixed output signal, wherein the input signal has a characterization RF frequency and a characterization RF power and the LO signal has a characterization LO frequency and a characterization LO power. The at least one non-transitory memory stores instructions that, when executed by the processing unit, cause the processing unit to determine multiple spurious peak powers of the mixed output signal by identifying peak powers that exceed a predetermined measurement threshold; determine multiple spurious frequencies corresponding to the multiple spurious peak powers of the mixed output signal, respectively, based on the multiple spurious peak powers; determine equations defining the multiple spurious frequencies of the mixed output signal in terms of the characterization RF frequency and the characterization LO frequency at the corresponding spurious peak powers, respectively; and after determining the equations, simulate mixing of a simulated RF signal and a simulated LO signal to output a simulated mixed output signal from an RF mixer model corresponding to the RF mixer, where the simulated input signal has a simulated RF frequency and a simulated RF power and the simulated LO signal has a simulated LO frequency and a simulated LO power. Simulating the mixing of the simulated input signal and the simulated LO signal includes applying the equations to the simulated RF frequency and the simulated LO frequency to determine multiple simulated spurious frequencies, multiple simulated spurious peak powers corresponding to the plurality of simulated spurious frequencies, and multiple simulated spurious phases corresponding to the plurality of simulated spurious frequencies of the simulated mixed output signal.

According to another representative embodiment, a non-transitory computer readable medium stores instructions for simulating spurious power of an RF mixer. When executed by a processing unit, the instructions cause the processing unit to determine multiple spurious peak powers of a mixed output signal by identifying peak powers that exceed a predetermined measurement threshold, where the mixed output signal is output by an RF mixer in response to mixing an input signal and an LO signal, where the input signal has a characterization RF frequency and a characterization RF power and the LO signal has a characterization LO frequency and a characterization LO power; determine multiple spurious frequencies corresponding to the multiple spurious peak powers of the mixed output signal, respectively, based on the plurality of spurious peak powers; determine sets of coefficients defining the plurality of spurious frequencies of the mixed output signal in terms of the characterization RF frequency and the characterization LO frequency at the corresponding plurality of spurious peak powers, respectively; and after determining the sets of coefficients, simulate mixing of a simulated input signal and a simulated LO signal to output a simulated mixed output signal from an RF mixer model corresponding to the RF mixer, wherein the simulated input signal has a simulated RF frequency and a simulated RF power and the simulated LO signal has a simulated LO frequency and a simulated LO power. Simulating the mixing of the simulated input signal and the simulated LO signal includes applying the sets of coefficients to the simulated RF frequency and the simulated LO frequency to determine multiple simulated spurious frequencies, multiple simulated spurious peak powers corresponding to the multiple simulated spurious frequencies, and multiple simulated spurious phases corresponding to the multiple simulated spurious frequencies of the simulated mixed output signal.

Generally, the various embodiments use a spurious vector set including a spurious power vector that provides spurious peak powers and a spurious frequency vector that provides frequencies corresponding to the spurious peak powers just as they would come from a test instrument (e.g., spectrum analyzer) or a circuit simulation tool, and an equation set derived from the spurious frequency vector. A measurement by the spectrum analyzer is a swept frequency response, and the spectrum peaks that exceed a predefined measurement threshold are placed in the spurious power vector for a given RF input power level. The user can take additional sweeps at different RF input power levels and get additional spurious vector sets. When the mixer model simulates the spurious response corresponding to the RF input power of a mixing operation, or through interpolation, the spurious vector set is used to generate the various simulated spurious responses. Intelligent vector processing routines are used in conjunction with reference frequencies used to characterize the data to determine a spurious response equation for each of the spurious peak powers in the spectrum.

Once this set of equations has been determined, then the spurious vector set can be used at different frequencies if the user so desires. Further, the behavioral mixer model is able to approximate power levels of the spurious responses when only a single vector of data is used or when input power levels are above or below the characterization power levels of the mixer spurious vector set. Accordingly, the various embodiments improve design and testing of RF mixers, particularly with regard to simulating spurious powers at corresponding frequencies from the mixing operation. Determining the spurious response equations to be applied to future simulations by working backwards from a set of spurious frequencies must be performed by a processing unit, due to the complexity of the calculations, in order to ensure timely analysis and improved efficiency of the simulation, as a practical matter.

Accordingly, unlike the conventional modeling, the various embodiments enable simple extraction of measured or simulated data for building the mixer model. Also, the mixer model supports multiple measurements to model power dependent spurious behavior. The mixer model only models data the user is interested in, and the user does not need to collect information for spurious behavior of all products. In addition, conventional tables may be easily converted to a spurious vector set format of the mixer model, so backward compatibility is fully supported.

FIG. 1 is a simplified block diagram illustrating a system for simulating spurious power of an RF mixer, according to a representative embodiment.

Referring to FIG. 1, computer system 100 includes a processing unit 110 and memory 120 for storing instructions executable by the processing unit 110 to implement the processes described herein, as well as a user interface 130, a network interface 140, and a display 150. The computer system 100 is shown in communication with a test instrument 160 via the network interface 140 to control testing by the test instrument 160 of an actual RF mixer 170 and/or to provide characterization data to and receive measurement data from the test instrument 160 with regard to testing the RF mixer 170, as discussed below. In an alternative embodiment, the computer system 100 may be in direct communication with the test instrument 160 via an instrument interface (not shown), without departing from the scope of the present teachings. In another embodiment, the computer system 100 may not have automated communication with the test instrument 160, in which case a user may input measurement data from the test instrument 160 to the computer system 100 via the user interface 130. The test instrument 160 may be any compatible test instrument capable of measuring spurious peak powers of the mixed output signal from the RF mixer 170, such as a spectrum analyzer or a VNA, for example. The line connecting the test instrument 160 to the network interface 140 is dashed to indicate that the test instrument 160 is only needed when characterizing the actual RF mixer 170, as discussed below, and is not required once the model is built or when the simulation is running.

Figure 2:
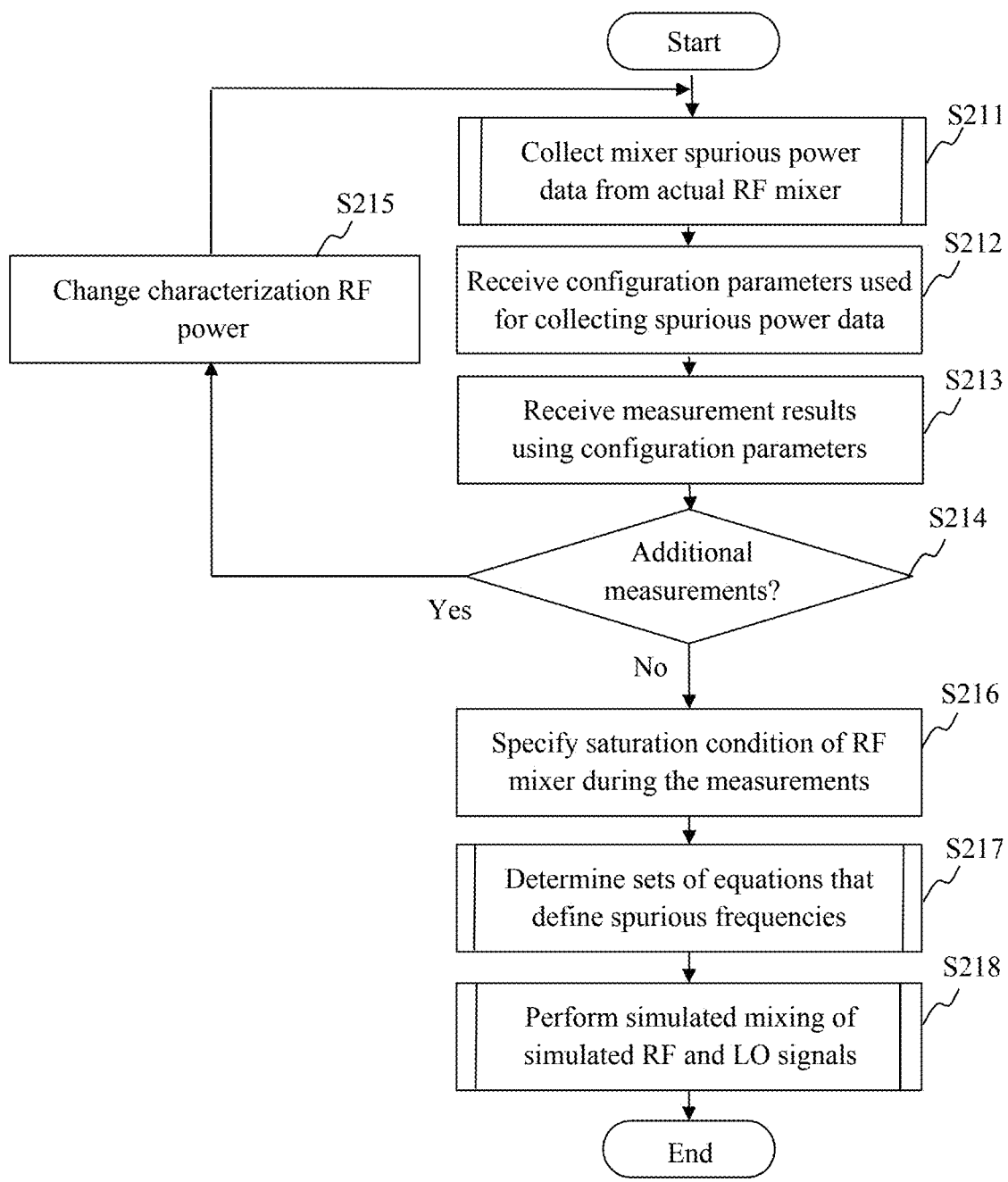
FIG. 2 is a flow diagram of a method for simulating spurious power of an RF mixer using a behavioral mixer model, according to a representative embodiment.
Figure 4:
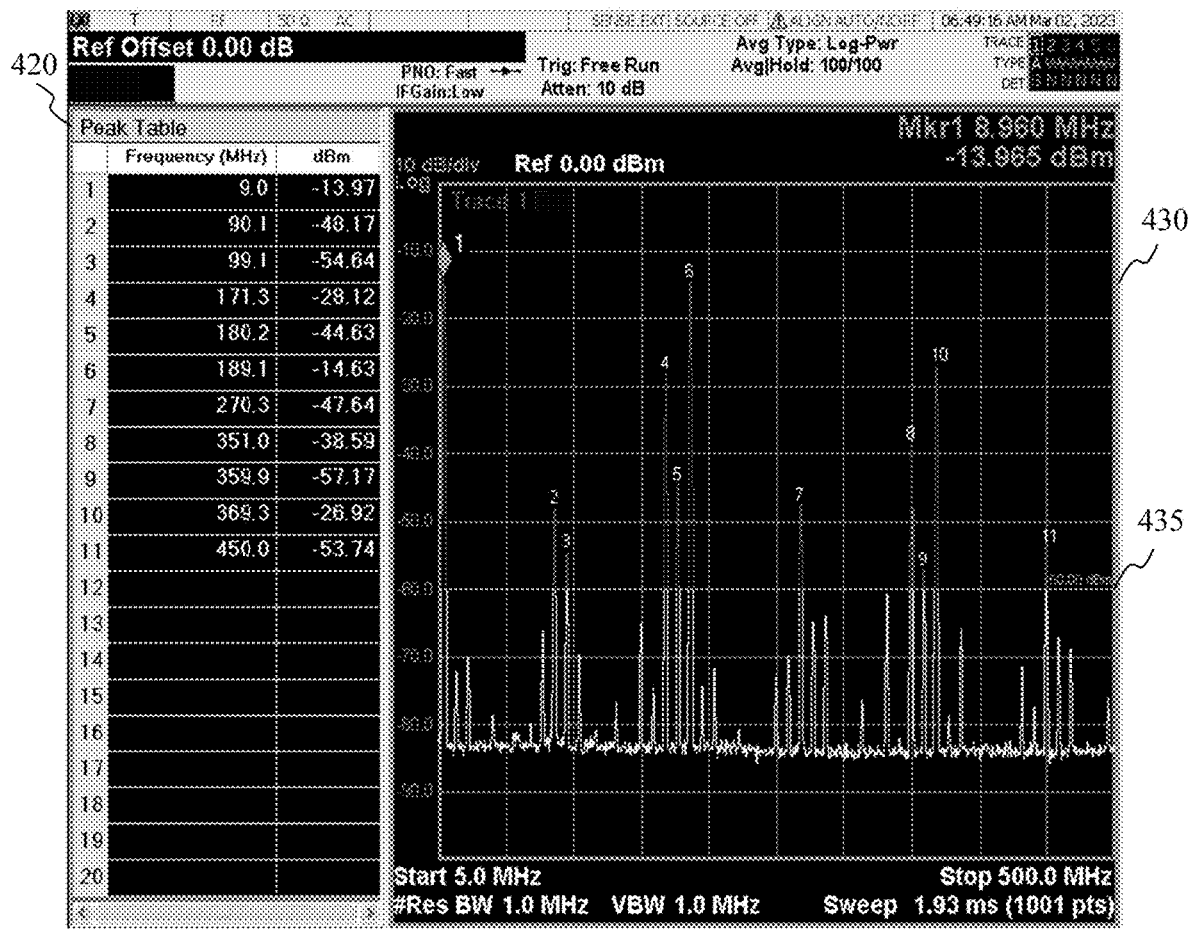
FIG. 4 is an example of a peak table from a spectrum analyzer for providing measurement results of an actual RF mixer based on the configuration parameters, according to a representative embodiment.

The processing unit 110 is representative of one or more processing devices and is configured to execute software instructions to perform functions as described in the various embodiments herein, including various steps in the methods set for in FIGS. 2 and 4, for example. The processing unit 110 may be implemented by a general purpose computer, a personal computer (PC), a central processing unit (CPU), a digital signal processor (DSP), a graphics processing unit (GPU), one or more processors, microprocessors or microcontrollers, a state machine, programmable logic device, field programmable gate arrays (FPGAs), application specific integrated circuits (ASICs), or combinations thereof, using any combination of hardware, software, firmware, hard-wired logic circuits, or combinations thereof. The term "processor," in particular, encompasses an electronic component able to execute a program or machine executable instructions. References to a processor should be interpreted to include more than one processor or processing core, as in a multi-core processor, and/or parallel processors. A processor may also refer to a collection of processors within a single computer system or distributed among multiple computer systems, such as in a cloud-based or other multi-site application. Programs have software instructions performed by one or multiple processors that may be within the same processing device or which may be distributed across multiple computing devices.

The memory 120 may include a main memory and/or a static memory, where such memories may communicate with each other and the processing unit 110 via one or more buses. The memory 120 stores instructions used to implement some or all aspects of methods and processes described herein. The memory 120 may be implemented by any number, type and combination of random-access memory (RAM) and read-only memory (ROM), for example, and may store various types of information, such as software algorithms and computer programs, all of which are executable by the processing unit 110. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of storage medium known in the art.

The memory 120 is a tangible storage medium for storing data and executable software instructions and is non-transitory during the time software instructions are stored therein.

As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A computer readable storage medium is defined to be any medium that constitutes patentable subject matter under 35 U.S.C. § 101 and excludes any medium that does not constitute patentable subject matter under 35 U.S.C. § 101. The memory 120 may store software instructions and/or computer readable code that enable performance of various functions. The memory 120 may be secure and/or encrypted, or unsecure and/or unencrypted.

The user interface 130 includes any known interface for providing information and data output by the processing unit 110 and/or the memory 120 to the user, and for receiving information and data input by the user. For example, the user interface 130 enables the user to enter data and to control or manipulate aspects of the processes described herein, and enables the processing unit 110 to indicate the effects of the user's control or manipulation. The user interface 130 may connect one or more user devices, such as a mouse, a keyboard, a trackball, a joystick, a haptic device, a microphone, a video camera, a touchpad, a touchscreen, voice or gesture recognition captured by a microphone or video camera, for example, or any other peripheral or control to permit user feedback from and interaction with the computer system 100.

The network interface 140 includes any known input/output connection to a data communication network, such as a local area network (LAN), a wide area network (WAN), a wireless LAN or WAN, Wifi, ethernet, a packet switching network, or the like. The network interface 140 enables connections between the computer system 100 and the test instrument 160, as mentioned above. The network interface 140 may further include one or more of ports, disk drives, wireless antennas, or other types of receiver circuitry.

The display 150 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 150 may also provide a graphical user interface (GUI) for displaying and receiving information to and from the user, in which case at least a portion of the user interface 130 is implemented via the display 150.

The test instrument 160 is configured to test the RF mixer 170 in order to measure responses at the output of the RF mixer 170 to first and second inputs. For purposes of explanation, the first input may be an RF port or an intermediate frequency (IF) port of the RF mixer 170, the second input may be an LO port, and the output may be the remaining one of the IF port or the RF port, depending the type of mixing. For example, in a down-converting operation, the first input is the RF port for receiving an input signal and the output is the IF port for outputting the mixed signal, while in a up-converting operation, the first input is the IF port for receiving the input signal and the output is the RF port for outputting the mixed signal, as would be apparent to one skilled in the art. In either case, the second input is the LO port for receiving the LO signal to mix with the input signal.

The RF mixer 170 is the same type of mixer the user wishes to simulate using the mixer model implemented by the computer system 100. RF source 172 generates the input signal at a predetermined characterization frequency and power that is provided to the first input of the RF mixer 170, and the LO source 174 generates an LO signal at a predetermined characterization frequency and power that is provided to the second input of the RF mixer 170. Each of the RF source 172 and the LO source 174 may be implemented by any compatible signal source, such as an arbitrary wave generator (AWG), for example. The RF mixer 170 mixes the input signal and the LO signal, and outputs the mixed output signal at the output. The test instrument 160 collects and measures mixer spurious power data from the mixed output signal to identify spurious peak powers and corresponding frequencies.

FIG. 2 is a flow diagram of a method for simulating an RF mixer using a behavioral mixer model, according to a representative embodiment. In various embodiments, at least a portion of the steps discussed with reference to FIG. 2, below, may be stored in the memory 120 as computer executable instructions and implemented by the by the processing unit 110.

Referring to FIG. 2, mixer spurious power data is collected (extracted) from an actual RF mixer (e.g., RF mixer 170) according to the process indicated by block S211. The spurious power data may be collected automatically under control of the processing unit 110, or manually by the user, for example, as discussed above. The RF mixer is the same type of RF mixer that is to be simulated. Collecting the mixer spurious power data generally includes mixing an input signal received at a first input of the RF mixer (RF or IF port) and an LO signal received at a second input of the RF mixer (LO port), and measuring the mixed output signal at the output of the RF mixer (IF or RF port) to determine spurious peak powers and corresponding spurious frequencies. The mixed output signal from the RF mixer may be measured using a test instrument (e.g., test instrument 160), such as a spectrum analyzer or a VNA, for example. Alternatively, the mixed output signal may be measured using a circuit simulation of the RF mixer in known circuit simulation software, such as Advanced Design System (ADS) software, for example.

Figure 3:
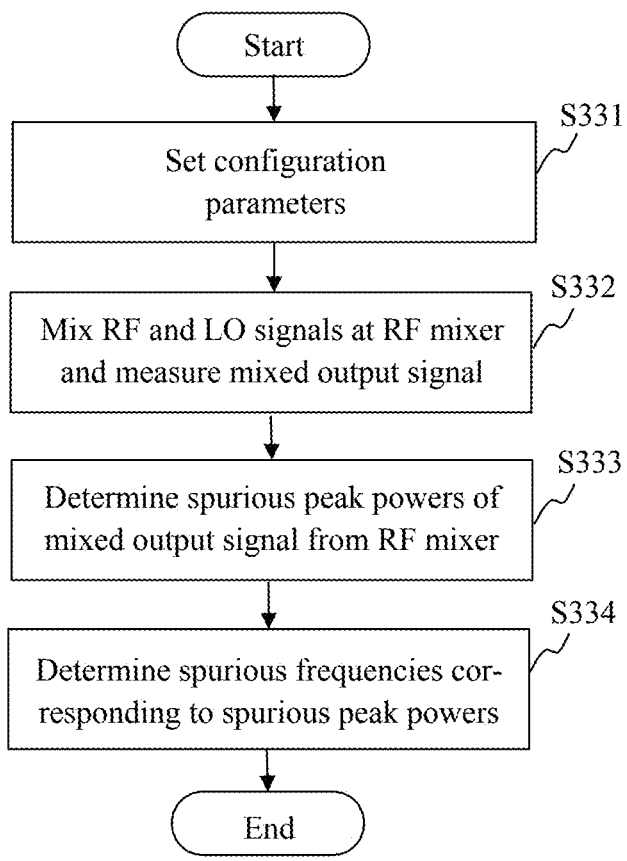
FIG. 3 is a flow diagram of a method for collecting spurious power data from an RF mixer, according to a representative embodiment.

FIG. 3 is a flow diagram of a method for collecting spurious power data from an RF mixer in block S211, according to a representative embodiment.

Referring to FIG. 3, in block S331, configuration parameters of the input and LO signals input to the RF mixer are provided by the user. The configuration parameters may be set to any desired values that are to be tested using the mixer model. The configuration parameters include a characterization RF frequency and a characterization RF power of the input signal, and a characterization LO frequency and a characterization LO power of the LO signal. The configuration parameters further include a measurement threshold for identifying the spurious peak powers. This predetermined measurement threshold indicates the power level above which a power peak in the mixed output signal is considered to be a spurious peak power.

In block S332, the input signal and the LO signal are mixed by the RF mixer to provide the mixed output signal, which includes peaks. The input signal has the characterization RF frequency and the characterization RF power, and the LO signal has the characterization LO frequency and the characterization LO power, as set in block S331.

In block S333, spurious peak powers are determined in the mixed output signal by identifying peaks occurring above the predetermined measurement threshold. The spurious peak powers of the mixed output signal are spurious responses to the mixing operation of the RF mixer.

In block S334, spurious frequencies corresponding to the spurious peak powers are determined based on the spurious peak powers. That is, only those frequencies that correspond to the peaks specifically identified as spurious peak powers are identified as spurious frequencies. Other frequencies that correspond to peaks that do not exceed the measurement threshold may be ignored. When using a spectrum analyzer, for example, the spurious peak powers and the corresponding spurious frequencies of the mixed output signal may be obtained from a known peak table created by the spectrum analyzer. An example of a peak table is shown in FIG. 4, discussed below. Alternatively, a software routine may be written to extract the spurious peak powers and spurious frequencies from trace data using the measurement threshold.

Generally, mixers generate harmonics during the mixing process. Therefore, in an embodiment, the mixing operation may include mixing the input and LO signals at multiple harmonics. For example, mixing the input and LO signals may include mixing the input signal at the characterization RF frequency with the LO signal at the characterization LO frequency and at multiple harmonics of the characterization LO frequency. Mixing the input and LO signals may further include mixing the input signal at one or more harmonics of the characterization RF frequency with the LO signal at the characterization LO frequency and multiple harmonics of the characterization LO frequency.

Referring again to FIG. 2, in block S212, the configuration parameters of the input and LO signals used for collecting the spurious power data in block S211 are received by the processing unit. The configuration parameters may be extracted directly from the test instrument, or may be entered by the user using a user interface (e.g., user interface 130), for example.

In block S213, the measurement results are also received by the processing unit acquired using the configuration parameters. The measurement results include the spurious peak powers of the mixed output signal (i.e., the peak powers exceeding the predetermined power level) and the spurious frequencies corresponding to the spurious peak powers of the mixed output signal, respectively. The measurement results may be extracted directly from the test instrument, or may be entered by the user from the user interface, for example. The measurement results may also be stored, e.g., in memory 120 or a database (not shown), in association the corresponding configuration parameters.

FIG. 4 is an example of a peak table from a spectrum analyzer for providing measurement results of an actual RF mixer based on the configuration parameters, according to a representative embodiment. The spectrum analyzer may be the test instrument 160, for example.

Referring to FIG. 4, peak table 420 of spectrum analyzer 400 is displayed adjacent to signal display 430, which shows the mixed output signal from the RF mixer as amplitude versus frequency between illustrative start frequency 5.0 MHz and stop frequency 500.0 MHz. In the depicted example, the characterization RF frequency is set to 99 MHz, the characterization RF power is set to −5 dBm, the characterization LO frequency is set to 90 MHz, and the characterization LO power is set to 7 dBm. In addition, measurement threshold 435 is set to −60 dBm, such that only spurious peak powers above −60 dBm within the frequency range of 5 MHz to 500 MHz will be identified in the peak table as spurious power data, together with the frequencies at which they occur, respectively. In the depicted example, there are 11 spurious peak powers that exceed the −60 dBm measurement threshold 435 (in dBm), all of which are listed in the peak table 420 next to the corresponding frequencies (in MHz). The peak table 420 and the RF and LO characterization frequencies and characterization powers comprise all the data needed for providing the mixer model of the RF mixer.

The measurement results provide a spurious vector set used to populate the mixer model. The spurious vector set includes a spurious power vector that provides the spurious peak powers and a spurious frequency vector that provides the frequencies corresponding to the spurious peak powers. Illustrative measurement results are shown in the peak table 420 for RF and LO signals having the configuration parameters, as well as the measurement threshold, identified above. The spurious power vector is equal to [−13.97, −48.17, −54.64, −28.12, −44.63, −14.63, −47.64, −38.59, −57.17, −26.92, −53.74] in dBm. The corresponding spurious frequency vector is equal to [9.0, 90.1, 99.1, 171.3, 180.2, 189.1, 270.3, 351.0, 359.9, 369.3, 450.0] in MHz. Of course, configuration parameters and measurement thresholds may vary to provide unique benefits for any particular situation or to meet application specific design requirements of various implementations, as would be apparent to one skilled in the art, without departing from the scope of the present teachings.

Notably, the power values of the spurious power vector and the frequency values of the spurious frequency vector as shown in the peak table 420 are absolute values. According to various embodiments, subsequent processing to determine a set of equations describing the spurious frequency vector, as discussed below, is performed using these absolute values. In comparison, conventional table mixer models are based on relative values of power and frequency as opposed to absolute values. Therefore, the peak table 420 is first converted to power and frequency values as they relate to a reference power and frequency values (e.g., the first entry of the peak table 420), which is very computationally expensive and time consuming.

Referring again to FIG. 2, it is determined in block S214 whether additional measurements will be performed using different characterization RF powers. That is, the mixer model may be developed using only one set of measurement results, and thus one spurious vector set. However, additional sets of measurement results based on different characterization RF powers may be incorporated to expand applicability of the mixer model, where more spurious vector sets generally provide a more comprehensive simulation of the RF mixer. Additional measurements are performed by changing only the characterization RF power because of the unpredictability of spurious amplitudes. If different characterization RF and/or LO frequencies are desired, a different set of data needs to be created with its own desired power levels. Even though a model may be used at different RF and LO frequencies than those characterized, the most accurate models are those extracted at the exact frequencies to be used in a simulation.

When additional measurement results are to be acquired (block S214: Yes), the process proceeds to block S215, where the characterization RF power is changed. The process then repeats blocks S211-S214 using the changed characterization RF power. For example, the characterization RF power of the input signal may be increased incrementally in consecutive loops, while the characterization RF frequency, the characterization LO frequency, and the characterization LO power remain unchanged. This enables the user to pick frequencies used in the application to provide accurate results, and then characterize the input RF powers at various power levels.

When no additional measurement results are to be acquired (block S214: No), the process advances to block S216. If the test instrument 160 and the RF mixer 170 were connected to the computer system 100, they may be disconnected for the remaining process. In block S216, the saturation condition of the RF mixer during the measurements is specified. The saturation condition may be either the maximum fundamental output power of the RF mixer or the highest power level of the spurious peak powers from the measured data. The maximum fundamental output power of the RF mixer is a design parameter, which may be obtained from by the RF mixer's data sheet, for example. The highest power level of the measured data is provided by the measurement results, and may be retrieved, for example, in the peak table. In the example shown in FIG. 4, the highest power level is −13.97 dBm, which would be recognized as the saturation condition.

The saturation condition of the RF mixer may be entered or otherwise specified by the user, or may be determined by the processing unit 110, particularly when the saturation condition is simply the highest power level of the measured data. If only one set of measurement results is used, the saturation condition is typically determined to be the maximum fundamental output power of the RF mixer, e.g., −13.97 dBm. The saturation condition may factor into determining the appropriate spurious power vector simulation, as discussed below.

The data entered and/or determined in accordance with blocks S211 to S216 are then applied to simulate functionality of the RF mixer by populating the mixer model and applying it to the data. Populating the mixer model begins in block S217, which indicates a process for determining sets of equations that define the spurious frequencies of the mixed output signals at which the spurious peak powers occur, as measured in blocks S211 to S216. The equations in each set are expressed in terms coefficients of the characterization RF and LO frequencies at the corresponding spurious peak powers, respectively, for the given characterization RF and LO powers. The coefficients are multipliers applied to the characterization RF and LO frequencies for each of the equations. In other words, each spurious frequency of the multiple spurious frequencies corresponding to the spurious peak powers, e.g., provided by the peak table, is defined in terms of (i) the characterization RF frequency, (ii) the characterization LO frequency, (iii) a difference between a multiple of the characterization RF frequency and a multiple of the characterization LO frequency, or (iv) a sum of a multiple of the characterization RF frequency and a multiple the characterization LO frequency, wherein the multiples are non-zero integers.

For example, referring FIG. 4, each of the spurious frequencies in the peak table 420 may be defined in terms of the characterization RF frequency (99 MHz), the characterization LO frequency (90 MHz), or differences between or sums of multiples of the same. For example, the first entry in the peak table 420 is 9.0 MHz, which may be represented by RF−LO (99 MHz-90 MHz); the second entry in the peak table 420 is 90.1 MHz, which may be represented by the LO (90 MHz); the third entry in the peak table 420 is 99.1 MHz, which may be represented by the RF (99 MHz); the eighth entry in the peak table 420 is 351.0 MHz, which may be represented by −RF+5LO (−99 MHz+450 MHz); and so on. Therefore, a corresponding set of equations as determined in block S217 in the order of appearance in the peak table 420 would be equal to [RF−LO, LO, RF, −RF+3LO, 2LO, RF+LO, 3LO, −RF+5LO, 4LO, RF+3LO, 5LO]. The coefficients representing these equations provide an RF frequency coefficient set that indicates multiples of the characterization RF frequency and an LO frequency coefficient set that indicates multiples of the characterization LO frequency at the corresponding spurious peak powers, respectively. Referring again to the example in FIG. 4, the RF frequency coefficient set is [1, 0, 1, −1, 0, 1, 0, −1, 0, 1, 0], and the LO frequency coefficient set is [−1, 1, 0, 3, 2, 1, 3, 5, 4, 3, 5]. The RF and LO frequency coefficient sets may be used for scaling the spurious peak powers at power levels outside of the measured spurious power vector, for determining actual output frequencies, and for determining the output phase, as discussed below. The set(s) of coefficients provide the mixer model.

Figure 5:
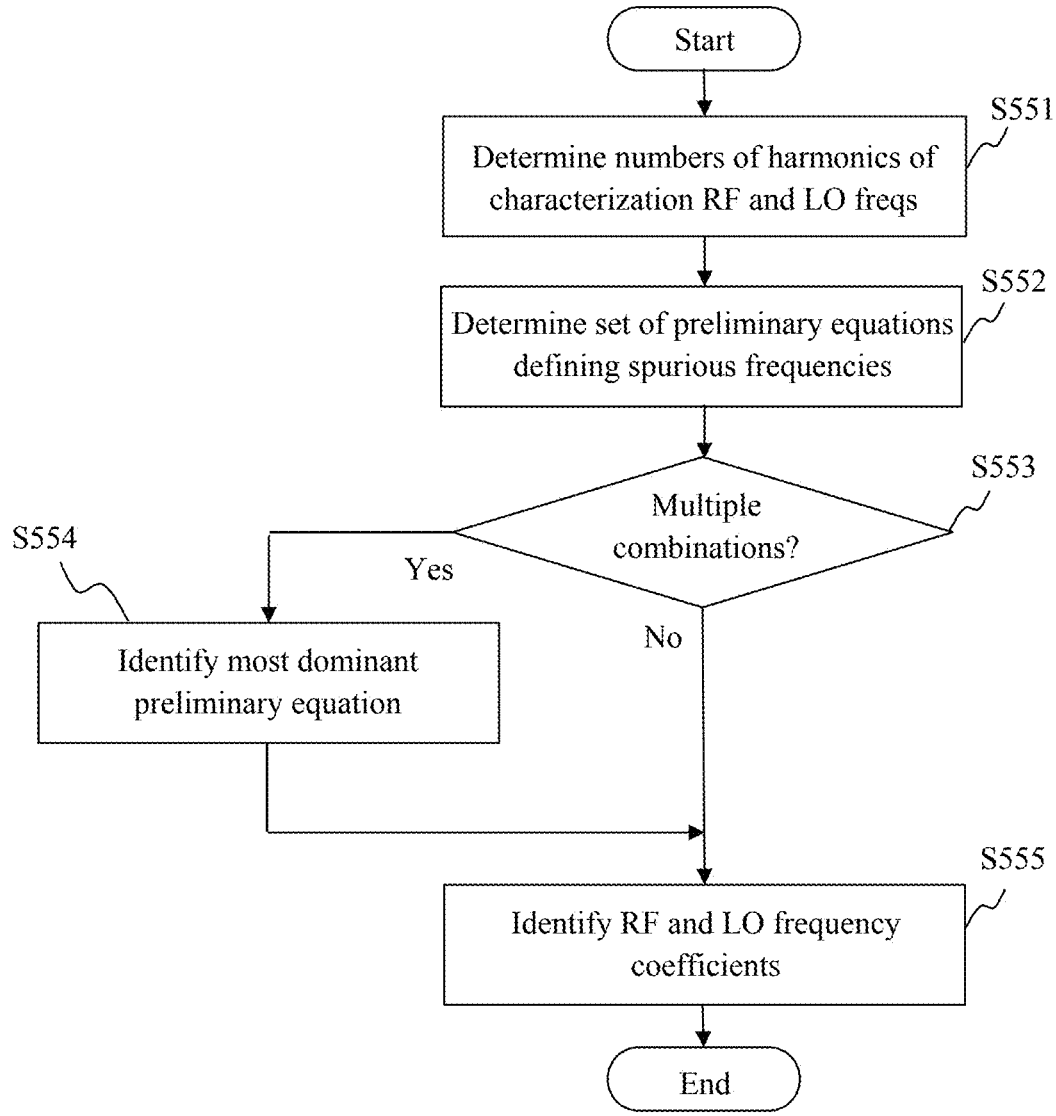
FIG. 5 is a flow diagram showing the process for determining equations defining spurious frequencies of the mixed output signals, according to a representative embodiment.

FIG. 5 is a flow diagram showing the process for determining the set of equations defining spurious frequencies of the mixed output signals, according to a representative embodiment.

Referring to FIG. 5, in block S551, the numbers of harmonics of the characterization RF frequencies and the characterization LO frequencies are determined for identifying the set of equations. The harmonics may be determined based on the maximum frequency of interest for collecting the spurious power data from the mixer output measurements. In the example depicted in FIG. 4, the maximum frequency of interest is 500 MHz. Generally, the higher the maximum frequency, or the lower the frequencies of the input signal (RF or IF) and/or the LO signal, respectively, the higher the number of harmonics that is needed to provide accurate simulation of spurious power.

In an embodiment, the number (order) of harmonics of the input signal (RF Limit) and the LO signal (LO Limit) used for measuring the spurious power data may be determined by dividing the maximum frequency of interest (e.g., 500 MHz) by the characterization RF frequency (F1) (e.g., 99 MHz) to obtain the RF Limit and by dividing the maximum frequency of interest (e.g., 500 MHz) by the characterization LO frequency (FLO) (e.g., 90 MHz) to obtain the LO Limit. Accordingly, in the example shown in FIG. 4, the RF Limit may be set to 5 (500 MHz/99 MHz) and the LO Limit may be set to 6 (500 MHz/90 MHz). Of course, different values of RF Limit and LO Limit, and/or different methods of determining the values of RF Limit and LO Limit, may be incorporated without departing from the scope of the present teachings.

In block S552, a set of preliminary equations is determined defining the spurious frequencies of the mixed output signal in terms of the characterization RF frequency and the characterization LO frequency at the corresponding of spurious peak powers, respectively. The set of preliminary equations may have multiple equations for one or more of the spurious frequencies, as discussed below.

In an embodiment, the set of preliminary equations is provided in a coefficient table, where each spurious frequency has at least one associated set of RF and LO frequency coefficients. That is, the coefficient table includes all potential combinations of characterization RF and LO frequencies that may provide the measured spurious peak powers and corresponding spurious frequencies. The coefficient table may be created before or after the spurious vector set (e.g., shown in FIG. 4) is determined from the RF mixer measurements, discussed above, and may be implemented as a relational database, for example. The entries of the spurious frequencies in the coefficient table may be determined from Equation (1):

$$\text{spurious frequency}_i = \sum_{k=-RFLimit}^{k=+RFLimit} F1*k + \sum_{n=-LOLimit}^{n=+LOLimit} FLO*n \quad \text{Equation (1)}$$

Referring to Equation (1), spurious frequency$_i$ is each of the spurious frequencies corresponding to all harmonics of the mixed output signal within a predetermined maximum order when mixing the characterization RF frequency and the characterization LO frequency, which may likewise correspond to possible spurious powers, where i is the number of spurious frequencies. The predetermined maximum order typically may be set to 10 to 15, for example, although higher maximum orders may be incorporated, e.g., depending on whether all measured spurious frequencies have been observed and/or available computational power, without departing from the scope of the present teachings. F1 is the characterization RF frequency of the input signal, FLO is the characterization LO frequency of the LO, k is the RF harmonic of the characterization RF frequency, and n is the LO harmonic of the characterization LO frequency. The RF harmonic k is stepped from the negative RF harmonic limit to the positive RF harmonic limit of the characterization RF frequency, and the LO harmonic n is stepped from the negative LO harmonic limit to the positive LO harmonic limit of the characterization LO frequency. That is, the characterization RF frequency is summed from k=−RF Limit to k=+RF Limit, and the characterization LO frequency is summed from n=−LO limit to n=+LO Limit.

Only positive spurious frequencies from Equation (1) are retained to populate the coefficient table. Further, when the LO harmonic n is 0 and the RF harmonic k is greater than 3, then the corresponding spurious combination is skipped because higher RF harmonics of just the input signals by themselves without the LO signals is rare.

In block S553, it is determined whether there are multiple combinations of RF and LO frequency coefficients that produce the same spurious frequency of the mixed output signal. As mentioned above, such multiple combinations may occur depending on the characterization RF and LO frequencies selected and the maximum frequency of interest. In an actual mixer, all of these spurious products may exist at this spurious frequency. However, one of the multiple combinations is likely to be the most dominant, so when simulating the spurious power of the mixer, the most dominant spurious frequency entry should be identified, and the coefficients associated with the most dominant spurious frequency entry should be selected.

When there is only one combination of RF and LO frequency coefficients for each spurious frequency in the preliminary equations (block S553: No), the RF and LO frequency coefficients may be identified as the RF and LO frequency coefficients for the spurious frequencies in the final equations in block S555. When there are multiple combinations of RF and LO frequency coefficients for one or more of spurious frequencies in the preliminary equations (block S553: Yes), the process proceeds to block S554 to identify the most dominant preliminary equation (intermod coefficient) associated with each of the spurious frequencies. That is, in block S554, the preliminary equations in the spurious table determined according to the Equation (1) are sorted in descending order, as shown in Equation (2):

$$\text{Intermod Coefficient} = \frac{\text{Order}! * LOFactor * OddOrderLOFactor}{|k|! + 2^{(Order-1)}} \quad \text{Equation (2)}$$

where:

$$Order = |k|$$

$$LOFactor = \begin{cases} 1, & n = 0 \\ 1/n, & n \geq 0 \end{cases}$$

$$OddOrderLOFactor = \begin{cases} 1 \text{ factor}, & \text{Order} \leq 1 \text{ or Order} = \text{Odd} \\ 0.1 \text{ factor}, & \text{Order} > 1 \text{ and Order} = \text{Even} \end{cases}$$

The highest intermod coefficient of the preliminary equations for each of the spurious frequencies is identified as the dominant preliminary equation. The process proceeds to block S555, in which the RF and LO frequency coefficients are chosen as the RF and LO frequency coefficients for the spurious frequencies in the final equations. The final equations are returned as set of equations that define the spurious frequencies of the mixed output signals at which the spurious peak powers occur.

Table 1 is an illustrative coefficient table showing only entries of preliminary equations associated with the first four spurious frequencies listed in the peak table 420 in FIG. 4, for purposes of explanation. Notably, the coefficient table is populated based on exact characterization frequencies (e.g., 90 MHz, 99 MHz), while the peak table 420 is populated using measured frequencies associated with spurious peaks. Therefore, the frequencies in Table 1 may not exactly match the measured frequencies (which are indicated in parenthesis when different), although use of the nearest frequency in the coefficient table is acceptable.

TABLE 1

| Frequency (MHz) | RF Harmonic | LO Harmonic | Order | Intermod Coefficient |
|---|---|---|---|---|
| 9 | 1 | −1 | 1 | 1.00 |
| 9 | −9 | 10 | 9 | 3.91E−05 |
| 90 (90.1) | 0 | 1 | 0 | 2.00 |
| 90 (90.1) | 10 | −10 | 10 | 1.95E−05 |
| 99 (99.1) | 1 | 0 | 1 | 1.00 |
| 171 (171.3) | −1 | 3 | 1 | 0.33 |
| 171 (171.3) | 9 | −8 | 9 | 4.88E−05 |

As can be seen from Table 1, based on the sorting, the RF and LO frequency coefficients 1 and −1 are selected for the 9 MHz spurious frequency, the RF and LO frequency coefficients 0 and 1 are selected for the 90.1 MHz spurious frequency, and the RF and LO frequency coefficients −1 and 3 are selected for the 171.3 MHz spurious frequency. The 99 MHz spurious frequency has only one set of the RF and LO frequency coefficients, so it may be selected without performing the sorting. Due to the numerous possible entries in the coefficient table, particularly for large frequency ranges of interest (e.g., 500 MHz), as well as the sorting of multiple entries for the same the spurious frequency, the coefficient table and equations defining the spurious frequencies of the mixed output signal cannot be practically calculated and applied in the human mind.

Referring again to FIG. 2, block S218 shows a process for performing simulated mixing of a simulated RF signal and a simulated LO signal by a processing unit using the set of equations (coefficient sets) from block S217 of the mixer model of the RF mixer to output a simulated mixed output signal. The simulated input signal has a simulated RF frequency and a simulated RF input power and the simulated LO signal has a simulated LO frequency and a simulated LO input power, which may be generated by the processing unit 110, for example.

Figure 6:
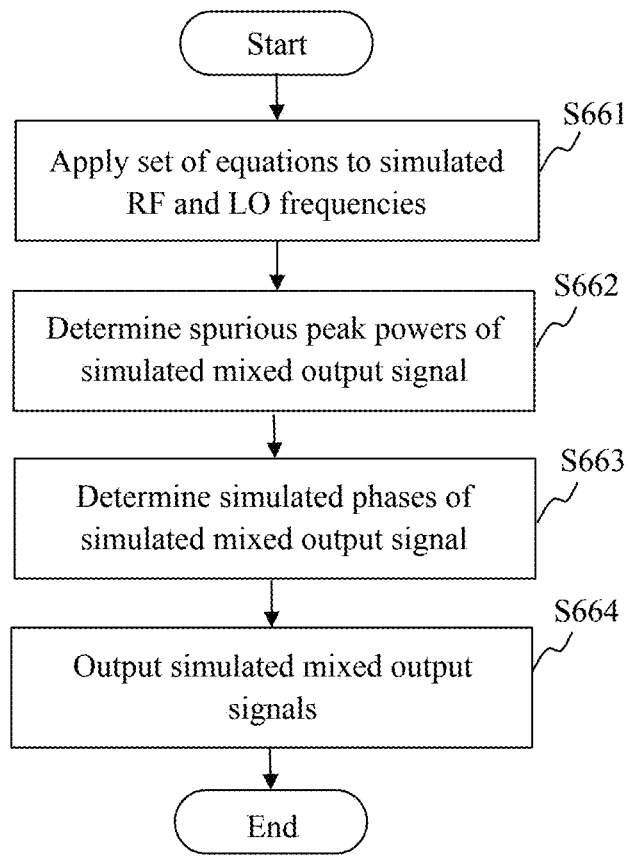
FIG. 6 is a flow diagram showing the process for creating mixer spurious output products of a simulated RF signal and a simulated LO signal, according to a representative embodiment.

FIG. 6 is a flow diagram showing the process of block S218 for creating mixer spurious output products of a simulated input signal and a simulated LO signal to provide simulated spurious peaks of a simulated mixed output signal, according to a representative embodiment.

Referring to FIG. 6, the process includes determining multiple simulated spurious frequencies of the simulated mixed output signal in block S661 by applying a set of equations determined in block S217 to the simulated RF frequency and the simulated LO frequency. The set of equations that is applied is the set of equations that was determined for the characterization RF and LO frequencies that match the simulated RF and LO frequencies, and the characterization RF and LO powers that match the simulated characterization RF and LO powers. So, in the example shown in FIG. 4, the set of equations derived from the peak table 420 would be applied in block 661 when the simulated RF frequency is 99 MHz, and the simulated LO frequency is 90 MHz.

In block S662, multiple simulated spurious peak powers of the simulated mixed output signal are determined, where the simulated spurious peak powers correspond to the simulated spurious frequencies, respectively. Ideally, the simulated RF input power and the simulated LO input power match the characterization RF power and the characterization LO power used when identifying the spurious frequencies and determining the applicable set of equations. For example, in FIG. 4, the simulated RF power would be −5 dBm and the simulated LO power would be 7 dBm for the spurious peak powers from the peak table 420 to apply directly. Otherwise, interpolation is used to determine the correct simulated spurious peak powers.

In particular, when the simulated RF input power, for example, is between the characterization RF powers associated with two sets of equations, linear interpolation between spurious peak power levels in these two sets of equations is used to determine the simulated spurious peak powers of the simulated mixed output signal. When the simulated RF input power is below the lowest characterization RF power associated with the available sets of equations, then theoretical spurious scaling is used for each of the spurious peak powers based on the coefficient of the RF multiplier from the set of equations derived using the lowest characterization RF power. When the simulated RF input power is above the highest characterization RF power associated with the available sets of equations, then the spurious peak powers are scaled the same way and limited by the saturation condition from step S216. That is, when the saturation condition is the maximum fundamental power, then the simulated spurious peak powers are scaled according to theoretical scaling until the maximum fundamental power is reached. When the saturation condition is the highest power level of the spurious peak powers from the measured data, then the simulated spurious peak powers are scaled such that they will not exceed the values in the highest spurious power vector.

In block S663, multiple simulated spurious phases of the simulated mixed output signal are determined, where the simulated spurious phases correspond to the simulated spurious frequencies, respectively. The simulated spurious phases may be determined from phases of the simulation input signal and the simulation LO signal, which may be set by the user. For example, the simulated spurious phases may be calculated from the phases of the simulated input and LO signals according to Equation (3):

$$\text{spurious phase} = k*\text{InputPhase} + n*\text{LOPhase} \qquad \text{Equation (3)}$$

In Equation (3), k is the RF harmonic of the simulated RF frequency, n is the LO harmonic of the simulated LO frequency, InputPhase is the phase of the simulated input signal, and LOPhase is the phase of the simulated LO signal. So, for example, when the input phase was 5 degrees and the LO phase was −7 degrees, then for k=1 and n=−1, the spurious phase is 1*5+(−1)*(−7)=12 degrees.

In block S664, simulated mixed output signals are provided by the mixer model with simulated spurious frequencies, simulated spurious peak powers at the simulated spurious frequencies, and simulated spurious phases at the simulated spurious frequencies, respectively. The simulated mixed output signals accurately portray the spurious responses of the RF mixer for different input data without having to test the actual RF mixer.

For purposes of illustration, a simulated input signal and a simulated LO signal are input to simulated first and second inputs of the mixer model to provide an illustrative simulated mixed output signal. The mixer model has been populated using the spurious vector set from FIG. 4, for example, in which the characterization RF frequency is 99 MHz, the characterization RF power is −5 dBm, the characterization LO frequency is 90 MHz, the characterization LO power is 7 dBm, and the saturation power is −5 dBm. The illustrative simulated input and LO signals being input to the mixer model include a simulated RF frequency of 123 MHz, a simulated RF input power of −5 dBm, a simulated RF phase of 10 degrees, a simulated LO frequency of 85 MHz, a simulated LO input power of 7 dBm, and a simulated LO phase of 1 degree.

Table 2 shows entries of the simulated mixed output signal at the spurious peak powers identified in FIG. 4, where the columns under "Measured Data" and the "Spurious Vector Sets" are part of the mixer model, and the columns under "Modeled Mixed Output Signal" show the simulated results of mixing the simulated RF and LO signals:

TABLE 2

| Measured data | | Spurious Vector Sets | | | Modeled Mixed Output Signal | | |
|---|---|---|---|---|---|---|---|
| Frequency (MHz) | Power (dBm) | Equation | RF Coeff. | LO Coeff. | Frequency (MHz) | Power (dBm) | Phase (Degrees) |
| 9 | −13.63 | RF − LO | 1 | −1 | 38 | −13.63 | 9 |
| 90.1 | −48.17 | LO | 0 | 1 | 85 | −48.17 | 1 |
| 99.1 | −54.64 | RF | 1 | 0 | 123 | −54.64 | 10 |
| 171.3 | −28.12 | −RF + 3LO | −1 | 3 | 132 | −28.12 | −7 |
| 180.2 | −44.63 | 2LO | 0 | 2 | 170 | −44.63 | 2 |
| 189.1 | −14.63 | RF + LO | 1 | 1 | 208 | −14.63 | 11 |

TABLE 2-continued

| Measured data | | Spurious Vector Sets | | | Modeled Mixed Output Signal | | |
|---|---|---|---|---|---|---|---|
| Frequency (MHz) | Power (dBm) | Equation | RF Coeff. | LO Coeff. | Frequency (MHz) | Power (dBm) | Phase (Degrees) |
| 270.3 | −47.64 | 3LO | 0 | 3 | 255 | −47.64 | 3 |
| 351.0 | −38.59 | −RF + 5LO | −1 | 5 | 302 | −38.59 | −5 |
| 359.9 | −57.17 | 4LO | 0 | 4 | 340 | −57.17 | 4 |
| 369.3 | −26.92 | RF + 3LO | 1 | 3 | 378 | −26.92 | 13 |
| 450.0 | −53.74 | 5LO | 0 | 5 | 425 | −53.74 | 5 |

The spurious vector set from FIG. 4 may be used in this example because the simulated RF input power of the simulated input signal is the same as the characterization RF power of the actual input signal (−5 dBm), and the simulated LO input power of the simulated LO signal is the same as the characterization LO power of the actual LO signal (7 dBm). In this case, the spurious peak powers are the same for the simulated RF and LO signals as for the characteristic RF and LO signals. When the simulated RF input power of the simulated input signal is different from the characterization RF power of the actual input signal of the spurious vector set used to populate Table 2, then the user applies a different spurious vector set, which was previously obtained using a characterization RF input power that matches the simulated RF input. Also, as discussed above, when the simulated RF input power does not match the characterization RF power of any spurious vector data set, then linear interpolation may be used to obtain values from the two closest spurious vector data sets above and below the simulated RF input power.

Generally, the embodiments provide different lengths of spurious vector sets for different input power levels. For example, when using multiple spurious vector sets, it would be normal for input signals with higher characterization RF powers to contain more spurious responses than input signals with lower characterization RF powers. However, each spurious vector set has its own equations, so once the simulated RF input power of a simulated input signal is determined, the appropriate spurious vector set will be used to create the spurious responses. Therefore, as the power level increases or decreases, the number of spurious responses generated by the mixer model will be dynamic. There would be no mechanism to interpolate between two spurious vector sets when an equation exists in one spurious vector set but no corresponding equation exists in the other spurious vector set. When this occurs, if the RF input power is equal to or above the characterization RF power for a given spurious peak power, then that spurious peak power is generated. Otherwise, if the RF input power is less than the characterization RF power, then that spurious peak power is ignored as it did not appear in the data for the lower input power level.

The foregoing embodiments have been described in the context of simulating spurious power of an RF mixer for mixing a single input signal with a single LO signal using an RF mixer model. However, the process also applies to simulating spurious power of an RF mixer for mixing two input signals with a single LO signal using the RF mixer model. This may be useful, for example, when modeling intermods in a mixed output signal output by the RF mixer. When mixing two input signals with a single LO signal, the substantially the same steps apply for simulating the spurious power as discussed above, except that the frequencies of both input signals are used to identify and sort spurious frequencies. For example, Equation (4) replaces Equation (1) for identifying spurious frequencies and populating a coefficient table, and Equation (5) replaces Equation (2) for sorting multiple entries for the same spurious frequencies.

$$\text{spurious frequency}_i = \sum_{k=-RFLimit}^{k=+RFLimit} F1*k + \sum_{m=-RFLimit}^{m=+RFLimit} F2*m + \sum_{k=-LOLimit}^{n=+LOLimit} FLO*n \quad \text{Equation (4)}$$

$$\text{Spurious Coefficient} = \frac{Order! * LOFactor * OddOrderLOFactor}{|k|!|m|! * 2^{(Order-1)}} \quad \text{where: Order} = |k| + |m| \quad \text{Equation (5)}$$

In Equations (4) and (5), F1 is the first characterization RF frequency of the input signal, F2 is the second characterization RF frequency of the input signal, and FLO is the characterization LO frequency of the LO. Also, k is the RF harmonic of the first characterization RF frequency, m is the RF harmonic of the second characterization RF frequency, and n is the LO harmonic of the characterization LO frequency. Otherwise, Equations (4) and (5) are applied the same as Equations (1) and (2), as discussed above.

Likewise, when there are two input signals with corresponding RF frequencies F1 and F2, the spurious phase may be calculated according to Equation (6), as opposed to Equation (3), discussed above:

$$\text{spurious phase} = k*F1\text{InputPhase} + k*F2\text{InputPhase} + n*\text{LOPhase} \quad \text{Equation (6)}$$

These equations are applied in the same manner described above to simulate spurious power using a mixer model to for mixing two simulated input signal and one simulated LO signal to output a simulated mixed output signal, where the simulated input signals have simulated RF frequencies and simulated RF powers, respectively, and the simulated LO signal has a simulated LO frequency and a simulated LO power, as discussed above.

In accordance with various embodiments of the present disclosure, all or portions of the methods described herein may be implemented using a hardware computer system that executes software programs stored on non-transitory storage mediums. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

The illustrations of the embodiments described herein are intended to provide a general understanding of the structure of the various embodiments. The illustrations are not intended to serve as a complete description of all of the elements and features of the disclosure described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

Aspects of the present disclosure may be embodied as an apparatus, method or computer program product. Accordingly, aspects of the present invention may take the form of an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of simulating spurious power of a radio frequency (RF) mixer, the method comprising:
   mixing an input signal and a local oscillator (LO) signal at an RF mixer and measuring a mixed output signal, wherein the input signal has a characterization RF frequency and a characterization RF power and the LO signal has a characterization LO frequency and a characterization LO power;
   determining a plurality of spurious peak powers of the mixed output signal by identifying peak powers that exceed a predetermined measurement threshold;
   determining a plurality of spurious frequencies corresponding to the plurality of spurious peak powers of the mixed output signal, respectively, based on the plurality of spurious peak powers;
   determining equations defining the plurality of spurious frequencies of the mixed output signal in terms of the characterization RF frequency and the characterization LO frequency at the corresponding plurality of spurious peak powers, respectively,
   wherein determining the equations comprises determining RF frequency coefficients indicating multiples of the characterization RF frequency and LO frequency coefficients indicating multiples of the characterization LO frequency at the corresponding plurality of spurious frequencies, respectively; and
   after determining the equations, simulating mixing of a simulated input signal and a simulated LO signal to output a simulated mixed output signal from an RF mixer model corresponding to the RF mixer, wherein the simulated input signal has a simulated RF frequency and a simulated RF power and the simulated LO signal has a simulated LO frequency and a simulated LO power,
   wherein simulating the mixing of the simulated input signal and the simulated LO signal comprises applying the equations to the simulated RF frequency and the simulated LO frequency to determine a plurality of simulated spurious frequencies, a plurality of simulated spurious peak powers corresponding to the plurality of simulated spurious frequencies, and a plurality of simulated spurious phases corresponding to the plurality of simulated spurious frequencies of the simulated mixed output signal.

2. The method of claim 1,
   wherein applying the equations to the simulated RF frequency and the simulated LO frequency comprises multiplying the simulated RF frequency by the RF frequency coefficients and multiplying the simulated LO frequency by the LO frequency coefficients at the corresponding spurious frequencies, respectively.

3. The method of claim 2, further comprising:
   creating a coefficient table containing spurious frequencies corresponding to possible harmonics of the mixed output signal within a predetermined maximum order when mixing the characterization RF frequency and the characterization LO frequency,
   wherein determining the RF frequency coefficients and the LO frequency coefficients comprises identifying the plurality of spurious frequencies in the coefficient table and extracting RF and LO frequency coefficients corresponding to the identified plurality of spurious frequencies.

4. The method of claim 3, wherein identifying the plurality of spurious frequencies in the coefficient table comprises sorting multiple entries of at least one spurious frequency of the plurality of spurious frequencies, and selecting a dominant spurious frequency entry as the at least one spurious frequency based on the sorting.

5. The method of claim 1, further comprising:
specifying a saturation condition of the RF mixer; and
when the simulated RF power of the simulated input signal exceeds a highest spurious peak power of the plurality of spurious peak powers, setting the simulated RF power to the saturation condition.

6. The method of claim 5, wherein the saturation condition comprises a maximum fundamental output power of the RF mixer or a highest power level of the plurality of spurious peak powers.

7. The method of claim 1, wherein determining the equations defining the plurality of spurious frequencies of the mixed output signal in terms of the characterization RF frequency and the characterization LO frequency, comprises:
defining each spurious frequency of the plurality of spurious frequencies corresponding to the plurality of spurious peak powers as (i) the characterization RF frequency, (ii) the characterization LO frequency, (iii) a difference between a multiple of the characterization RF frequency and a multiple of the characterization LO frequency, or (iv) a sum of a multiple of the characterization RF frequency and a multiple the characterization LO frequency, wherein the multiples are non-zero integers.

8. The method of claim 1, wherein mixing the input signal and the LO signal at the RF mixer and measuring the mixed output signal comprises:
mixing the input signal at the characterization RF frequency with the LO signal at the characterization LO frequency and multiple harmonics of the characterization LO frequency; and
mixing the input signal at one or more harmonics of the characterization RF frequency with the LO signal at the characterization LO frequency and multiple harmonics of the characterization LO frequency.

9. The method of claim 1, further comprising:
further mixing the input signal and the LO signal at the RF mixer and measuring the mixed output signal, wherein the input signal has a different characterization RF frequency and a different characterization RF power and the LO signal has a different characterization LO frequency and a different characterization LO power;
determining another plurality of spurious peak powers of the mixed output signal by identifying peak powers that exceed the predetermined measurement threshold;
determining another plurality of spurious frequencies corresponding to the another plurality of spurious peak powers of the mixed output signal, respectively, based on the another plurality of spurious peak powers; and
determining additional equations defining the another plurality of spurious frequencies of the mixed output signal in terms of the different characterization RF frequency and the different characterization LO frequency at the corresponding another plurality of spurious peak powers, respectively.

10. The method of claim 1, wherein the mixed output signal is measured using a spectrum analyzer.

11. The method of claim 1, wherein the mixed output signal is measured using a circuit simulation of a mixer in circuit simulation software.

12. A system for simulating spurious power of a radio frequency (RF) mixer, the system comprising:
a test instrument configured to measure a mixed output signal from an RF mixer in response to mixing an input signal and a local oscillator (LO) signal, wherein the input signal has a characterization RF frequency and a characterization RF power and the LO signal has a characterization LO frequency and a characterization LO power;
a processing unit; and
at least one non-transitory memory storing instructions that, when executed by the processing unit, cause the processing unit to:
determine a plurality of spurious peak powers of the mixed output signal by identifying peak powers that exceed a predetermined measurement threshold;
determine a plurality of spurious frequencies corresponding to the plurality of spurious peak powers of the mixed output signal, respectively, based on the plurality of spurious peak powers;
determine sets of coefficients defining the plurality of spurious frequencies of the mixed output signal in terms of the characterization RF frequency and the characterization LO frequency at the corresponding plurality of spurious peak powers, respectively; and
after determining the sets of coefficients, simulate mixing of a simulated input signal and a simulated LO signal to output a simulated mixed output signal from an RF mixer model corresponding to the RF mixer, wherein the simulated input signal has a simulated RF frequency and a simulated RF power and the simulated LO signal has a simulated LO frequency and a simulated LO power,
wherein simulating the mixing of the simulated input signal and the simulated LO signal comprises applying the sets of coefficients to the simulated RF frequency and the simulated LO frequency to determine a plurality of simulated spurious frequencies, a plurality of simulated spurious peak powers corresponding to the plurality of simulated spurious frequencies, and a plurality of simulated spurious phases corresponding to the plurality of simulated spurious frequencies of the simulated mixed output signal.

13. The system of claim 12, wherein the instructions cause the processing unit to determine the sets of coefficients defining the plurality of spurious frequencies of the mixed output signal by:
creating a set of RF frequency coefficients indicating multiples of the characterization RF frequency and a set of LO frequency coefficients indicating multiples of the characterization LO frequency at the corresponding plurality of spurious peak powers, respectively,
wherein applying the sets of coefficients to the simulated RF frequency and the simulated LO frequency comprises multiplying the simulated RF frequency by the RF frequency coefficients and multiplying the simulated LO frequency by the LO frequency coefficients at the corresponding spurious frequencies, respectively.

14. The system of claim 12, wherein the instructions further cause the processing unit to:
specify a saturation condition of the RF mixer; and
when the simulated RF power of the simulated input signal exceeds a highest spurious peak power of the plurality of spurious peak powers, set the simulated RF power to the saturation condition.

15. The system of claim 14, wherein the saturation condition comprises a maximum fundamental output power of the RF mixer.

16. The system of claim 14, wherein the saturation condition comprises a highest power level of the plurality of spurious peak powers.

17. The system of claim 14, wherein the test instrument comprises a spectrum analyzer or a vector network analyzer (VNA).

18. The system of claim 14, wherein the test instrument comprises a circuit simulation of a mixer in circuit simulation software.

19. The system of claim 18, wherein the circuit simulation software comprises Advanced Design System (ADS) software.

20. A non-transitory computer readable medium storing instructions for simulating spurious power of a radio frequency (RF) mixer that, when executed by a processing unit, cause the processing unit to:
   determine a plurality of spurious peak powers of a mixed output signal by identifying peak powers that exceed a predetermined measurement threshold, wherein the mixed output signal is output by an RF mixer in response to mixing an input signal and a local oscillator (LO) signal, wherein the input signal has a characterization RF frequency and a characterization RF power and the LO signal has a characterization LO frequency and a characterization LO power;
   determine a plurality of spurious frequencies corresponding to the plurality of spurious peak powers of the mixed output signal, respectively, based on the plurality of spurious peak powers;
   determine sets of coefficients defining the plurality of spurious frequencies of the mixed output signal in terms of the characterization RF frequency and the characterization LO frequency at the corresponding plurality of spurious peak powers, respectively; and
   after determining the sets of coefficients, simulate mixing of a simulated input signal and a simulated LO signal to output a simulated mixed output signal from an RF mixer model corresponding to the RF mixer, wherein the simulated input signal has a simulated RF frequency and a simulated RF power and the simulated LO signal has a simulated LO frequency and a simulated LO power,
   wherein simulating the mixing of the simulated input signal and the simulated LO signal comprises applying the sets of coefficients to the simulated RF frequency and the simulated LO frequency to determine a plurality of simulated spurious frequencies, a plurality of simulated spurious peak powers corresponding to the plurality of simulated spurious frequencies, and a plurality of simulated spurious phases corresponding to the plurality of simulated spurious frequencies of the simulated mixed output signal.

* * * * *